C. BARNES.
Steam Gage.
No. 49,961.
Patented Sept. 19, 1865.
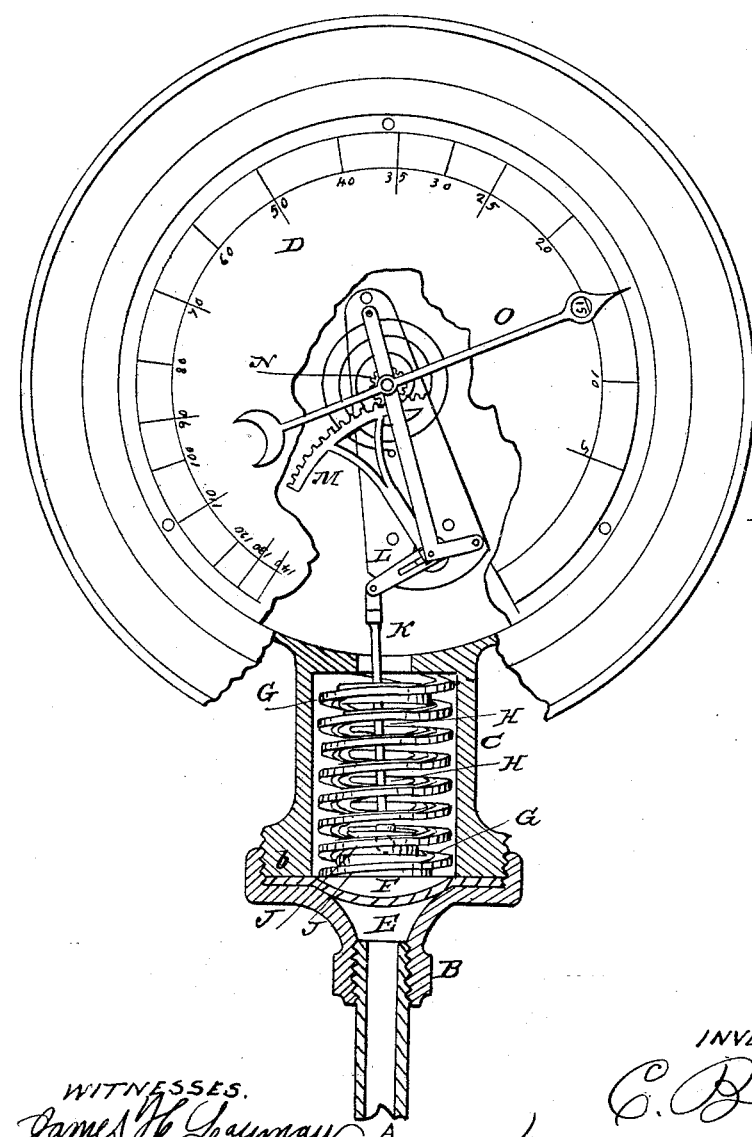
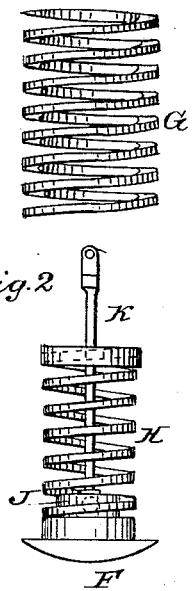

UNITED STATES PATENT OFFICE.

CHARLES BARNES, OF CINCINNATI, OHIO.

IMPROVEMENT IN STEAM-GAGES.

Specification forming part of Letters Patent No. 49,961, dated September 19, 1865.

*To all whom it may concern:*

Be it known that I, CHARLES BARNES, of Cincinnati, Hamilton county, Ohio, have invented a new and useful Improvement in Steam-Gages; and I do hereby declare the following to be a full, clear, and exact description thereof, reference being had to the accompanying drawings, making part of this specification.

My invention relates to a construction of gage capable of indicating upon a single dial the entire range of pressures combined with extreme sensitiveness under a light pressure without the liability to disagreement of dial indications with the actual pressure by giving way of the spring in active use.

Figure 1 is a front elevation, partly in section, of a gage embodying my improvements. Fig. 2 represents the two members of my compound spring detached.

A represents a pipe, which proceeds from the steam-space of a boiler.

B is a flaring joint-piece or coupling, whose internally screw-threaded rim $b$ receives the correspondingly screw-threaded hollow stem C, which supports the dial D.

Securely grasped between the coupling B and the stem C is an india-rubber diaphragm, E, upon which rests a disk, F, which supports an exterior and highly-sensitive spring, G, and an interior and stiffer and somewhat shorter spring, H. Up to a pressure of about forty pounds upon the square inch, only the longer and more sensitive spring, G, presses against the upper end of the hollow stem C, at which point the inner and stiffer spring H begins to bear. By providing in this way two or more concentric helical springs of unequal and gradually-increasing resistance, I am enabled to combine extreme sensitiveness of indication for low pressures with an adequate indication of high pressures in the compass of a single dial.

The disk F carries two bosses, I and J, which fit within the lower ends of the springs G and H, respectively.

Secured to the box J is a rod, K, whose upper extremity is pivoted to an arm, L, upon a segment-rack, M, which gears within a pinion, N, upon the shaft of the index-hand O.

It will be seen that by employing a series of springs acting in succession the strain is so divided as not to sensibly impair the tensional force of any one, as is commonly the case after a brief use where a single spring is required to serve for the entire range of pressures.

I claim herein as new and of my invention—

The provision in a steam-gage of two or more springs, G H, of unequal tension, arranged and operating in the manner and for the purpose set forth.

In testimony of which invention I hereunto set my hand.

CHARLES BARNES.

Witnesses:
GEO. H. KNIGHT,
JAMES H. LAYMAN.